Jan. 26, 1971     H. H. ADISE     3,557,611
TONOMETER WITH CORRECT USAGE INDICATOR
Filed Nov. 1, 1968     2 Sheets-Sheet 1
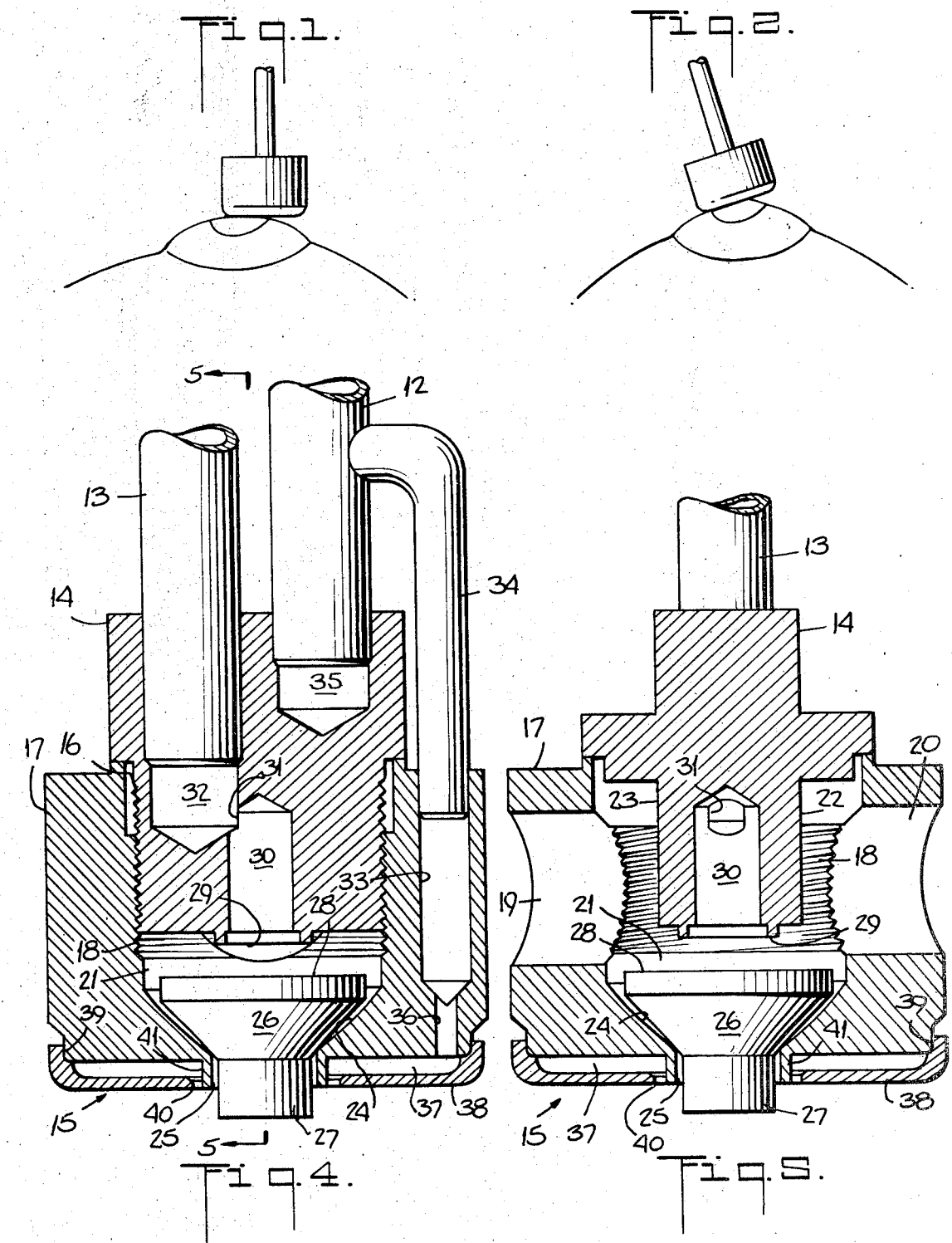
INVENTOR.
HERBERT H. ADISE
BY
Ward, McElhannon, Brooks & Fitzpatrick
ATTORNEYS

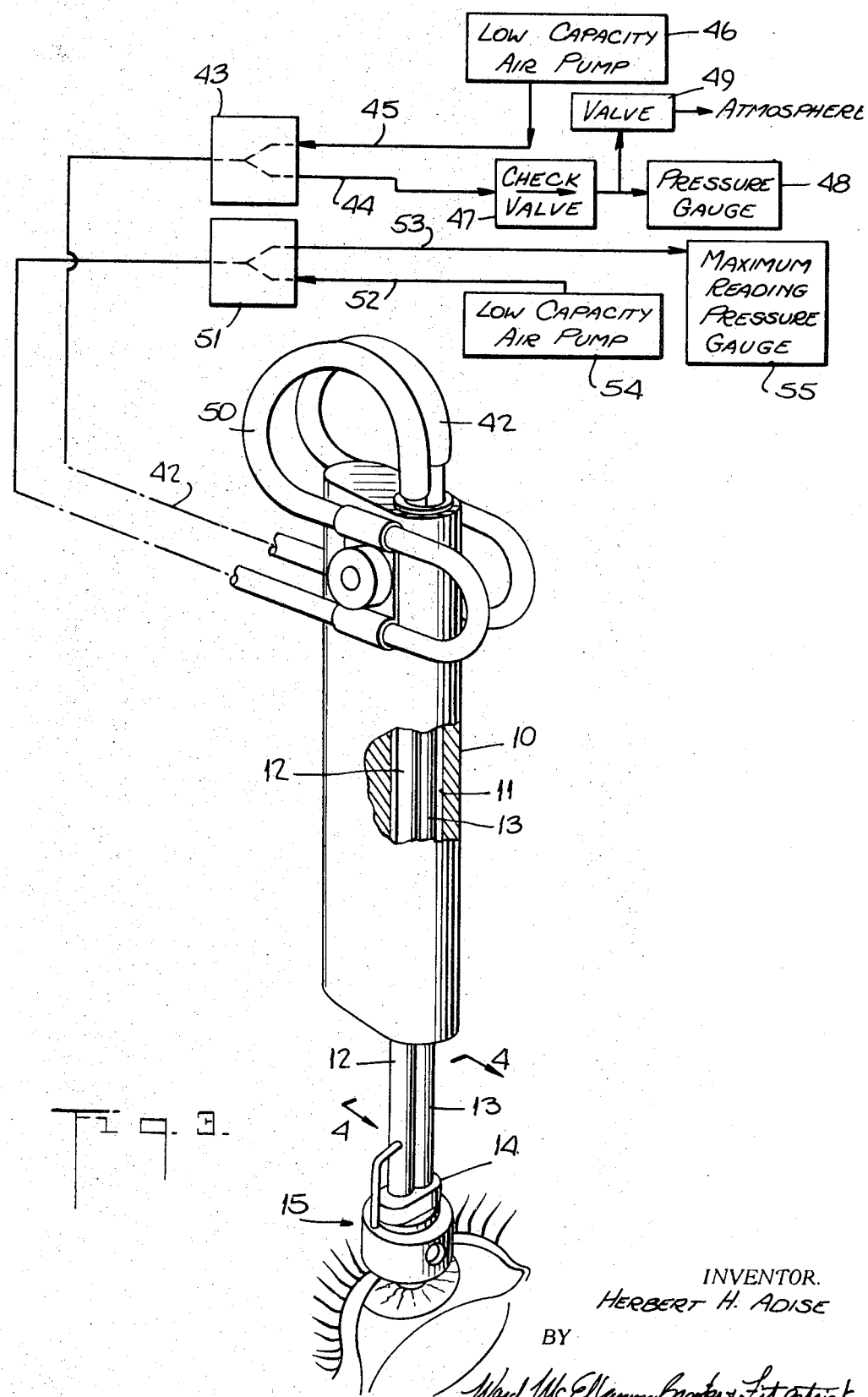

United States Patent Office 3,557,611
Patented Jan. 26, 1971

1

3,557,611
TONOMETER WITH CORRECT USAGE INDICATOR
Herbert H. Adise, Great Neck, N.Y., assignor to Computer Instruments Corporation, Hempstead, N.Y., a corporation of New York
Filed Nov. 1, 1968, Ser. No. 772,628
Int. Cl. A61b 3/16
U.S. Cl. 73—80    9 Claims

ABSTRACT OF THE DISCLOSURE

In a projecting plunger type of tonometer, a circular orifice is disposed around the plunger in the end wall of the probe communicating with a chamber supplied with air from a low capacity pump. Proper application of the tonometer to an eyeball will occlude the entire circular orifice causing the air pressure within the aforesaid chamber to build up to the maximum capacity of the pump within the time necessary for the instrument to take a tonometeric reading which pressure can be read from a pressure guage as an indication of such correct operation of the instrument.

---

The present invention relates to a tonometer for measuring the intraocular pressure of an eyeball.

In my U.S. Pat. No. 3,272,001, issued Sept. 13, 1966, there is described a tonometer employing an extendable pin actuated by air pressure. More particularly, there is described in said patent a device which comprises a probe having a wall for engaging the surface of the eyeball, an axially movable plunger carrier within the probe with an end extending through an aperture in the wall, means for extending the plunger from the wall when the probe is out of contact with the eyeball, the means permitting the plunger to retract when the wall of the probe is urged into contact with the eyeball, means actuated upon retraction of the plunger for urging the plunger towards its extended position with continually increasing force until the resistance due to the intraoculuar pressure is overcome, and means for indicating the magnitude of the force which is required to overcome the resistance.

Experience in the field with the aforesaid tonometer has shown that it is capable of providing accurate readings if a moderate amount of care is taken in its operation. Nevertheless, it is possible to apply the probe improperly to the eyeball and thereby obtain a false or erroneous reading. It is, therefore, an object of the present invention to provide means for determining whether or not the probe has been properly applied by the operator.

In order for a tonometer of the foregoing construction to provide accurate readings it is necessary that the entire end of the movable plunger engage a flattened portion of the eyeball. If the probe is applied to the eyeball at an angle or accentrically only a portion of the end of the plunger will contact the flattened eyeball and false readings will result.

For the purpose of avoiding the aforementioned errors, there is provided in accordance with the present invention a device for measuring the intraocular pressure of an eyeball comprising: a probe having a head with a wall applicable against the surface of an eyeball, means located in the wall within a zone spaced inwardly from the wall boundaries and responsive to engagement with the eyeball surface for actuating a measuring circuit as a function of the pressure, the means being caused to provide an erroneous response upon failure of the entire zone to be brought at one time into engagement with the eyeball surface, sensing means in the wall surrounding the zone for engaging the surface of the eyeball, and indicating

2 means coupled to the sensing means for indicating if the entire sensing means engages the eyeball surface at one time during application of the probe wall thereto.

The invention will be better understood after reading the following detailed description of a presently preferred embodiment thereof with reference to the appended drawings wherein:

FIG. 1 is a diagrammatic illustration of one type of error encountered in the application of the subject probe to an eyeball;

FIG. 2 is a view similar to FIG. 1 showing a different type of error;

FIG. 3 is a combined perspective and schematic view of a tonometer constructed in accordance with the present invention and showing it in operative position;

FIG. 4 is a fragmentary sectional view on an enlarged scale taken along line 4—4 in FIG. 3; and FIG. 5 is a sectional view taken along line 5—5 in FIG. 4.

Throughout the drawings the same reference numerals are used to designate the same or similar parts.

Referring to FIG. 1, a probe is shown applied somewhat eccentrically or displaced from the center of the pupil such that the flattened portion of the eye will not be centrally located relative to the operative face of the probe. A similar condition results when the probe is applied at an angle as shown in FIG. 2. The significance of the error will be better understood after reading the ensuing description of the probe construction.

Reference should now be had to FIGS. 3, 4, and 5. The probe consists basically of a handle 10 having a through longitudinal bore 11 within which a pair of hollow tubes 12 and 13 are supported for free axial movement.

The tubes 12 and 13 may be metallic and terminate within a body member 14 of a probe head 15. The body member 14 has an externally threaded section 16 of slightly reduced diameters which telescopes threadedly into a cap-like member 17. The member 17 is internally threaded at 18. As best seen in FIG. 5, the member 17 is also provided with opposite ports 19 and 20 communicating with a chamber 21 formed between the member 17 and the body member 14. It will be seen that segments of the body member 14 are removed at 22 and 23 in order to provide clearance at the mouths of the ports 19 and 20.

The lower end of the chamber 21 has a tapered or frusto conical section 24 leading to a cylindrical aperture 25 which communicates with the exterior of the probe head. A plunger 26 having the general configuration shown in FIGS. 4 and 5 is disposed in the chamber 21 with the cylindrical neck 27 extending through the aperture 25. The extent to which the plunger 26 projects as seen in FIG. 4 of the drawings is such that when the probe is applied to the eyeball such that the end of the plunger is depressed until it is flush with the mouth of the aperture 25, the rear surface 28 of the plunger will engage the annular shoulder or valve seat 29 to seal off the passage 30. The passage 30 is in communication through a port 31 with the bore 32 containing the end of tube 13.

The cap-like member 17 is provided with a bore 33 near the periphery thereof into which is secured one end of a short connecting tube 34, the other end of which is tapped into the tube 12. The bottom end of the tube 12 dead ends in a bore 35 in the body member 14. The lower end of bore 33 communicates with a connecting bore 36 which leads to a lower chamber 37 formed between the lower end of the member 17 and a face cap 38. The face cap 38 is provided with a rabbet at 39 permitting it to telescope over the lower end of the member 17 and be brazed or otherwise secured thereto. An aperture 40 is provided in the center of the cap 38 of slightly larger diameter than the outer diameter of a skirt portion 41 depending from the bottom of the member 17 and providing the wall which defines the aperture 25. The orifice formed between the aperture 40 and the skirt 41 may have a radial dimension of the order of 0.01 inch while the thickness of the skirt 41 may be of similar magnitude.

Referring to FIG. 3, the upper end of tube 13 is connected by a flexible rubber or plastic tube 42 to a manifold 43 from which two branch pipes 44 and 45 emerge. The pipe 45 is connected to a low capacity air pump 46 while the pipe 44 is connected through a check valve 47 to a pressure gauge 48 and a relief valve 49.

In somewhat similar fashion a length of flexible tubing 50 connects the upper end of tube 12 to a manifold 51. The manifold 51 functions to connect the tube 50 to the two conduits 52 and 53. The conduit 52 is joined to a low capacity air pump 54 while the conduit 53 is connected to a maximum reading pressure gauge 55.

The pressure gauge 48 may take the form of any conventional low pressure gauge capable of covering the range of from zero to 50 millimeters of mercury. The gauge 55 should have a capacity equal to the maximum pressure capacity of the associated pump 54. In the preferred embodiment being described, good results have been obtained utilizing a pump 54 having a maximum capacity of about 10 millimeters of mercury.

When it is desired to operate the tonometer, the air pumps are placed in operation and both pressure gauges are set to zero. The gauge 48 is set to zero by opening the relief valve 49 to vent any pressure trapped between the check valve 47 and the gauge 48. The maximum reading pressure gauge will be reset to zero by means of the usual mechanical return lever conventionally found thereon.

Air supplied by pump 46 will pass through the manifold 43, tubing 42 and tube 13 into the passage or bore 30 in the body member 14. With the plunger 26 being unopposed, the pressure developed against the surface 28 will force it to unseat and project as shown in FIGS. 4 and 5. Upon application of the tonometer in a vertical position to the eyeball, as shown in FIG. 3, contact between the eye and the plunger will cause the latter to move into the chamber 21 and seat against the seat 29. In normal application the operator will hold the tonometer by the handle 10 applying the head 15 to the eyeball such that the probe head and tubes 12 and 13, floating loosely within the handle, rest on the eyeball under their own weight. It will be understood that this applies the probe with a predetermined force to the eyeball. The weight of the probe is controlled such that a suitable flattening of the eyeball is obtained over the range of intraocular pressures normally encountered.

When the plunger 26 engages the seat 29 it seals off the passage 30 from the chamber 21 and the vent ports 19 and 20. Thereupon, pressure begins to build up within the closed system between the pressure gauge 48 and the plunger 26. When the pressure just overcomes the intraocular pressure the plunger 26 will unseat uncovering the vent ports 19 and 20. This will interrupt the rise in pressure in the conduits leading to the pressure gauge 48. Upon removing the tonometer from the eyeball the check valve 47 will retain the maximum pressure in the sealed conduits between the valve 47 and the gauge 48 until the release valve 49 is actuated. This provides an opportunity for the operator to take his reading. The operation of the intraocular pressure measuring system just described is substantially identical to the system described and claimed in the aforesaid patent.

If the probe has been used properly the orifice formed between the aperture 40 and skirt 41 will be occluded due to contact with the surface of the eyeball. It will be understood that if this orifice is occluded, of necessity, the entire face of the plunger 26 will have been engaged. When the orifice aforementioned is occluded, pressure will build up in chamber 37 and in the closed conduit system leading to gauge 55. Thus, assuming that the pump 54 has a maximum pressure capacity of 10 millimeters of mercury, the gauge 55 will indicate 10 millimeters of mercury pressure if the orifice leading from chamber 37 is occluded for at least a predetermined minimum period. However, if the probe is improperly applied to the eyeball such that only a portion of the orifice between aperture 40 and skirt 41 is occluded, sufficient venting will occur with respect to chamber 37 to prevent the pressure in the system leading to gauge 55 from building up to the maximum capacity of the pump 54. A similar result will be experienced if the orifice is occluded for too short a time. Therefore, the operator need only consult the gauge 55 to determine whether or not he has properly applied the tonometer to the eyeball. If the gauge 55 shows its proper maximum reading it indicates correct usage of the instrument. The operator can then take his reading from gauge 48.

It will be understood that the maximum pressure capacity of the pump 54 should be substantially less than that of the pump 46. As previously mentioned, the pump 54 has a maximum pressure capacity of about 10 millimeters of mercury while the pump 46 should be capable of developing a pressure of about 50 millimeters of mercury. It should also be understood that the orifice which vents chamber 37 should be related to the capacity of the pump 54 such that the pressure within the chamber 37 reaches the maximum pressure capacity of pump 54 only when the orifice is completely occluded by contact with the eyeball surface for a time sufficient to enable the plunger 26 to respond to the intraocular pressure.

The invention has been described with reference to the presently preferred embodiment thereof. It will be understood that various changes in construction may be made therein without departing from the true spirit of the invention as defined in the appended claims.

What is claimed is:

1. A device for measuring the intraocular pressure of an eyeball comprising: measuring apparatus, a probe having a head with a wall applicable against the surface of an eyeball, means located in said wall within a zone spaced inwardly from the wall boundaries and responsive to engagement with said eyeball surface for actuating said measuring apparatus as a function of said pressure, said means being caused to provide an erroneous response upon failure of said entire zone to be brought at one time into engagement with said eyeball surface, sensing means in said wall surrounding said zone for engaging the surface of said eyeball, and indicating means coupled to said sensing means for indicating if the entire sensing means engages said eyeball surface at one time during application of said probe wall thereto.

2. A device according to claim 1, wherein said head contains a chamber adjacent said wall, said sensing means comprises orifice means providing communication between said chamber and the exterior of said head, and said indicating means comprises means for supplying air to said chamber at a restricted rate, and means for indicating the maximum air pressure developed within said chamber during application of said probe to said eyeball surface.

3. A device according to claim 2, wherein said means for supplying air to said chamber comprises a low capacity air pump coupled by a pneumatic conduit through a passage in said head to said chamber, and said means for indicating the maximum air pressure comprises a maximum reading pressure gauge coupled to said conduit.

4. A device according to claim 1, wherein said head contains a chamber adjacent said wall and said wall has a flat exterior surface for application against an eyeball, said sensing means comprises a circular orifice in said wall providing communication between said chamber and said exterior surface of the wall, and said indicating means comprises a low capacity air pump coupled by conduit means through a passage in said head to said chamber, and a maximum reading pressure gauge coupled to said conduit means for indicating the maximum air pressure developed within said chamber during application of said probe to said eyeball surface.

5. A device according to claim 4, wherein the maximum pressure capacity of said air pump is of the order of 10 mm. of mercury.

6. A device for measuring the intraocular pressure of an eyeball comprising: a probe having a head with a wall for engaging the surface of said eyeball, a first chamber within said head, an axially movable plunger carried within said first chamber and having one end extending through an aperture in said wall to the exterior, said plunger being movable between protrudent and retracted positions, a first source of air under pressure at a low supply rate, first fluid conduit means coupling said first source with the interior of said first chamber for introducing said air into said chamber for acting against said plunger to urge the latter into said protrudent position with said one end protruding externally from said wall when the probe is out of contact with said intraocular pressure is overcome and the plunger chamber other than said first mentioned wall for venting said first chamber when said plunger is in said protrudent position for maintaining the pressure of said air, at least within said first chamber, at a level inadequate to prevent depression of said plunger into said retracted position when the first mentioned wall of the probe is urged into contact with said eyeball, valve means carried by said plunger and operable upon said depression of said plunger for isolating said port from said conduit means whereby the air pressure acting upon said plunger is caused to rise continually until the resistance due to said intraocular pressure is overcome and the plunger is again urged toward said protrudent position, first pressure gauging means coupled to said conduit means at a point where the internal pressure corresponds closely with the pressure acting upon said plunger for indicating the magnitude of said intraocular pressure, a second chamber within said head, isolated from said first chamber, an orifice in said first mentioned wall surrounding said aperture a short distance therefrom, said second chamber being in communication with said orifice, a second source of air under pressure at a low supply rate, second fluid conduit means coupling said second source with the interior of said second chamber for supplying air thereto, and second pressure gauging means coupled to said second conduit means at a point where the internal pressure corresponds with the pressure within said second chamber, said orifice being related to said second source of air such that the pressure within said second chamber reaches the maximum pressure capacity of said second source only when said orifice is completely occluded by contact with said eyeball surface for a time sufficient to enable said plunger to respond to the intraocular pressure.

7. A device according to claim 6, wherein the maximum pressure capacity of said second source of air is substantially less than that of said first source of air.

8. A device according to claim 7, wherein the maximum pressure capacity of said second source of air is of the order of 10 mm. of mercury.

9. A device according to claim 8, wherein said orifice has a radial dimension of about 0.01 inch and is spaced about 0.01 inch from the border of said aperture.

References Cited

UNITED STATES PATENTS

| | | | |
|---|---|---|---|
| 2,314,514 | 3/1943 | Parsons | 73—80 |
| 3,099,262 | 7/1963 | Bigliano | 128—2.05 |
| 3,102,534 | 9/1963 | Bigliano | 128—2.05 |
| 3,390,572 | 7/1968 | Murr | 73—80 |
| 3,487,679 | 1/1970 | Yamamori | 73—80 |

RICHARD C. QUEISSER, Primary Examiner

C. E. SNEE III, Assistant Examiner

PO-1050
(5/69)

UNITED STATES PATENT OFFICE
CERTIFICATE OF CORRECTION

Patent No. 3,557,611      Dated January 26, 1971

Inventor(s) HERBERT H. ADISE

It is certified that error appears in the above-identified patent and that said Letters Patent are hereby corrected as shown below:

Column 1, Line 56, "accentrically" should read

--eccentrically--

Column 2, Line 37, "diameters" should read

--diameter--

Column 5, Line 22, "intraocular pressure is overcome and the plunger" should be changed read --eyeball, at least one port in wall of said first--

Signed and sealed this 4th day of May 1971.

(SEAL)
Attest:

EDWARD M. FLETCHER, JR.             WILLIAM E. SCHUYLER
Attesting Officer                       Commissioner of Pat